May 13, 1924.
W. S. DU CHARME
COOKING APPARATUS
Filed Sept. 1 1922
1,493,925
4 Sheets-Sheet 1
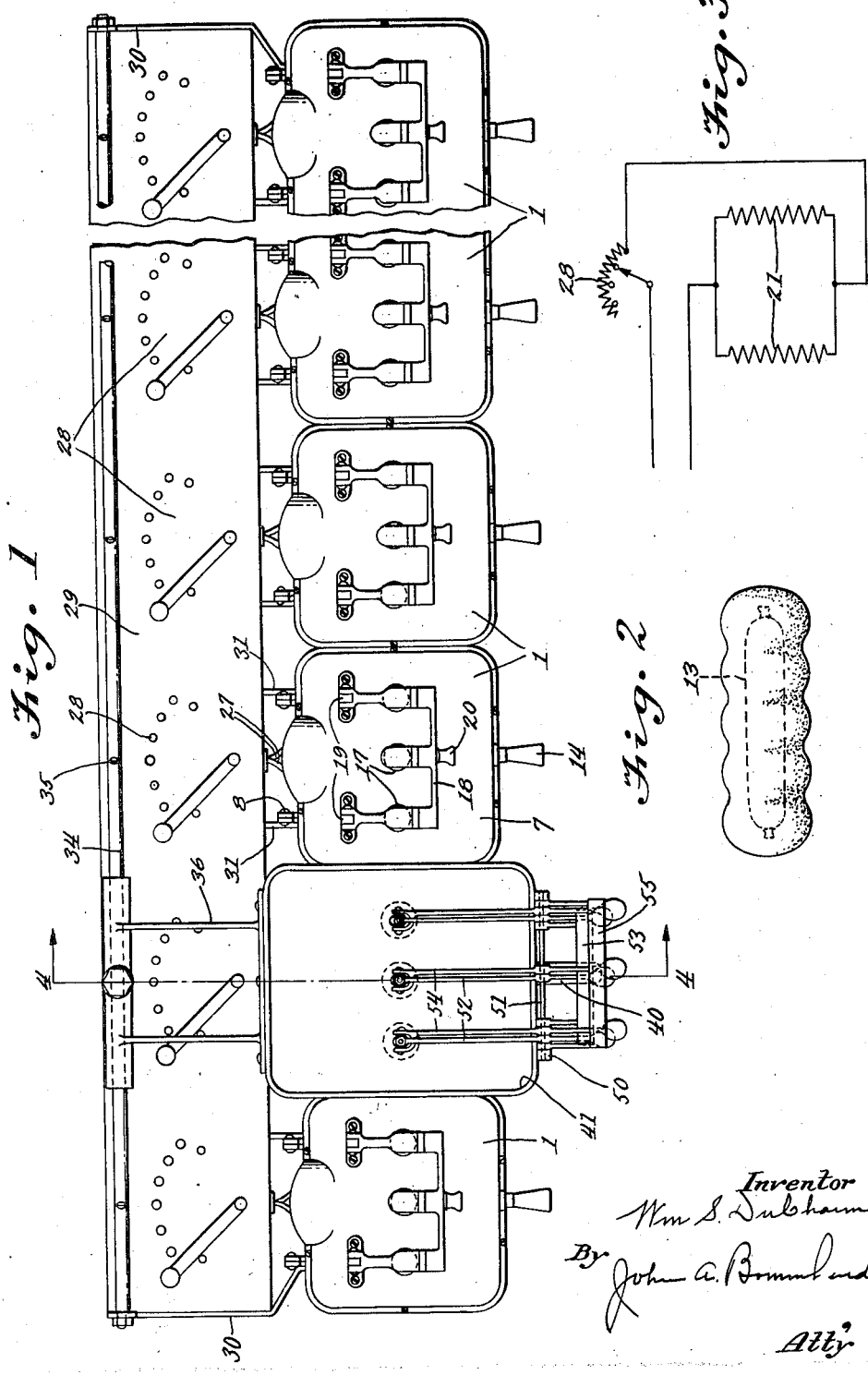

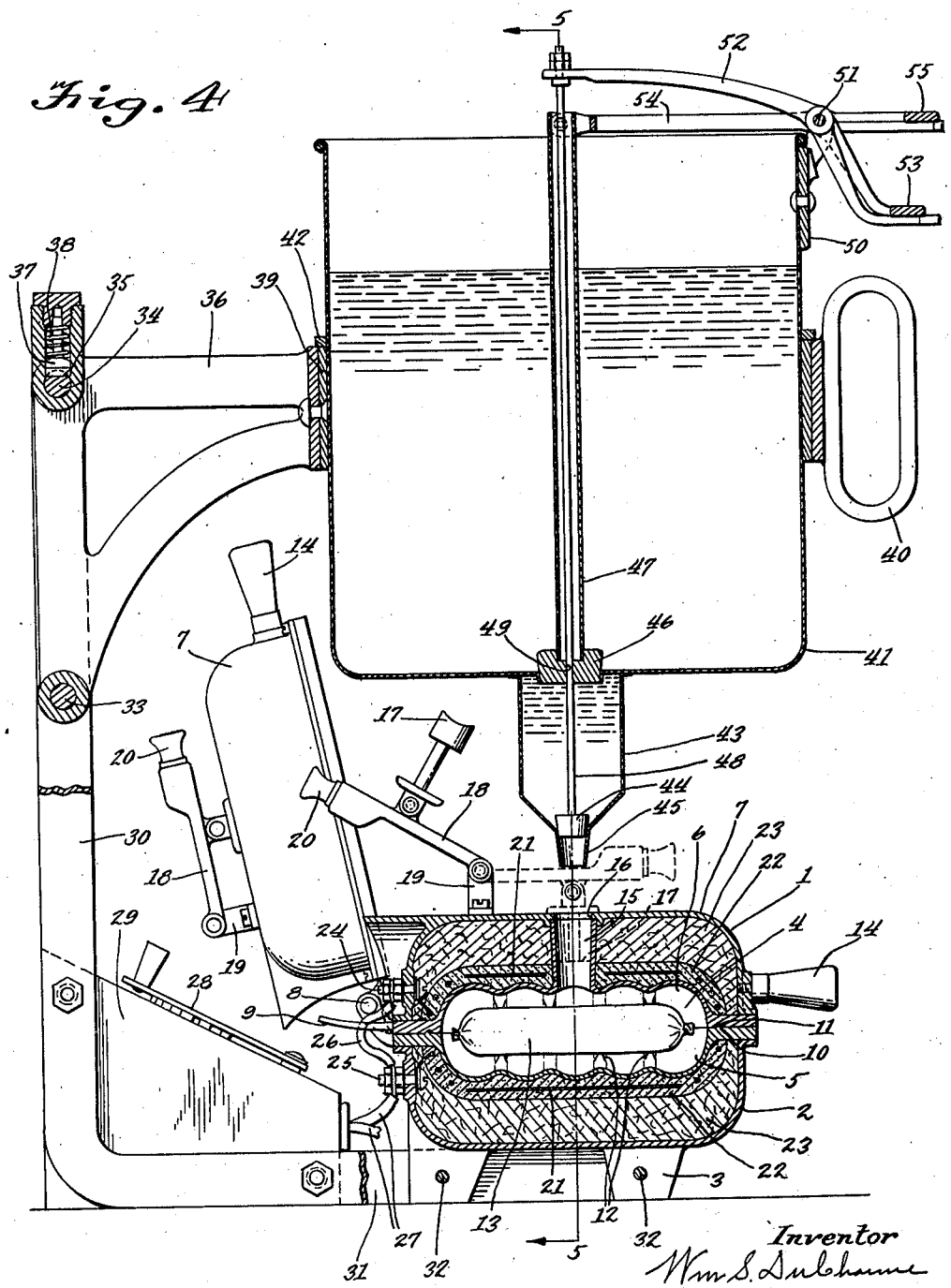

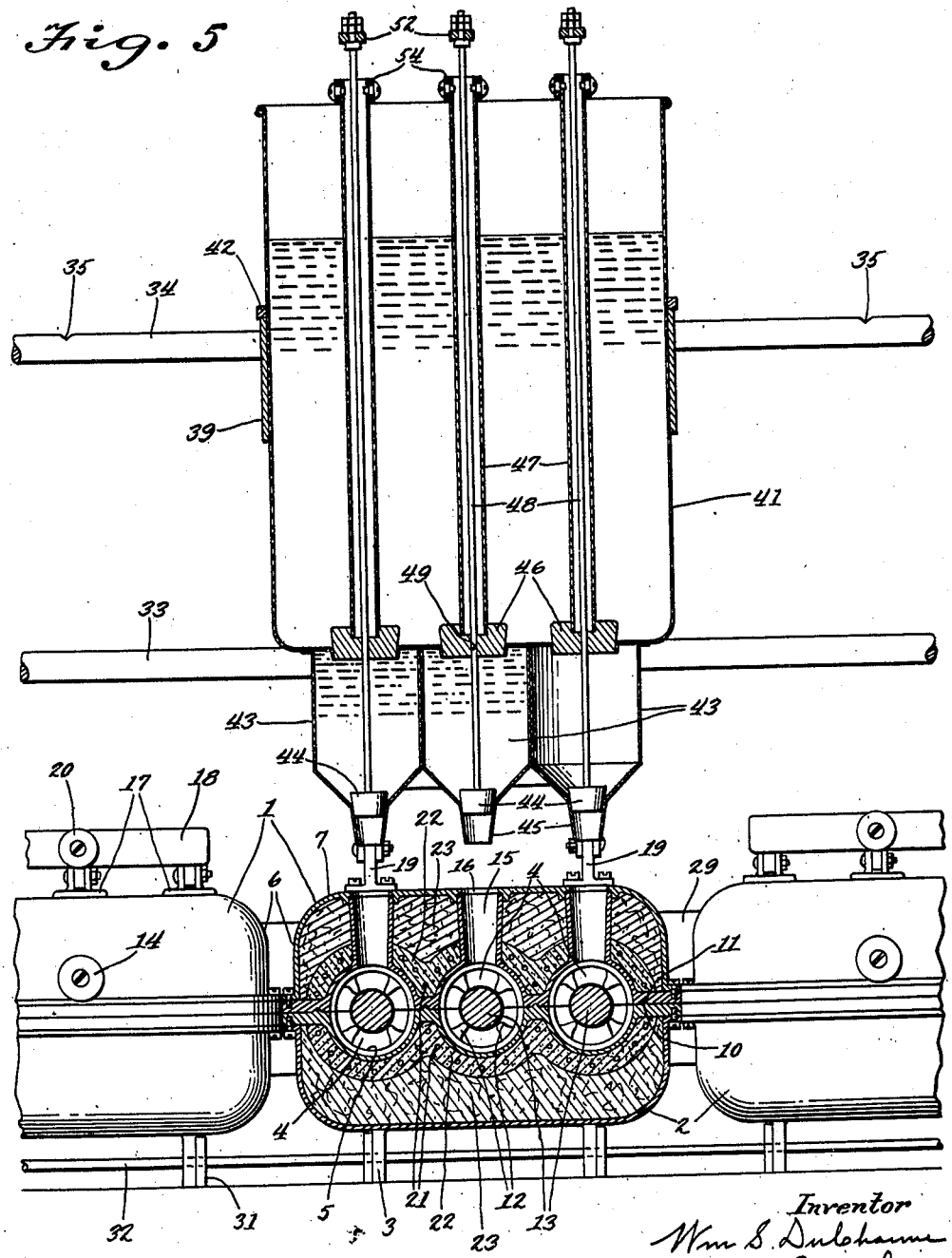

May 13, 1924.　　　W. S. DU CHARME　　　1,493,925
COOKING APPARATUS
Filed Sept. 1, 1922　　　4 Sheets-Sheet 4
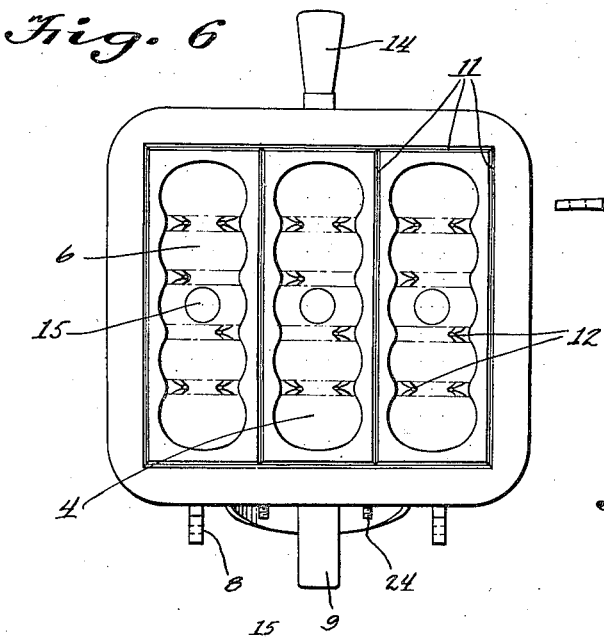
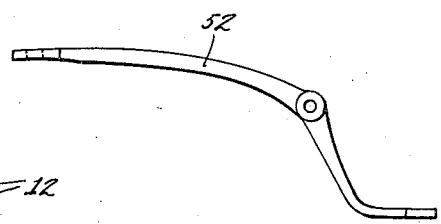
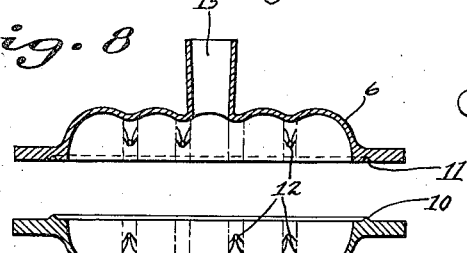
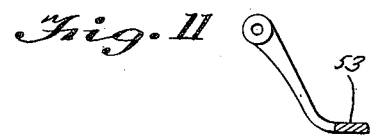
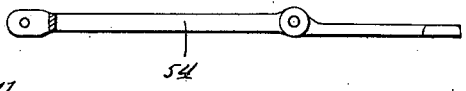
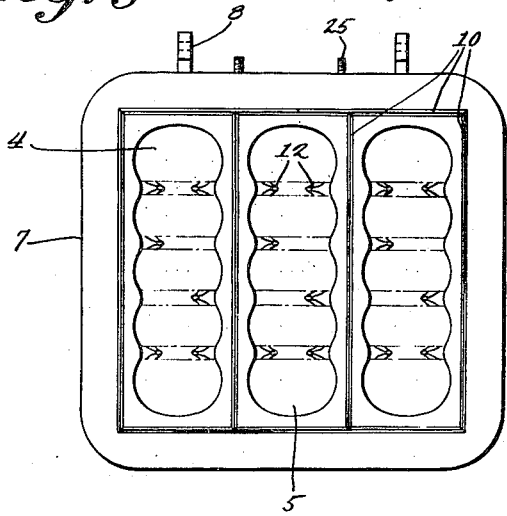

Patented May 13, 1924.

1,493,925

UNITED STATES PATENT OFFICE.

WILLIAM S. DU CHARME, OF CLEVELAND, OHIO.

COOKING APPARATUS.

Application filed September 1, 1922. Serial No. 585,827.

*To all whom it may concern:*

Be it known that I, WILLIAM S. DU CHARME, citizen of the United States, residing at Cleveland, in the county of Cuyahoga and State of Ohio, have invented certain new and useful Improvements in Cooking Apparatus, of which the following is a specification.

This invention relates to a machine for making a cooked food product and is particularly applicable for baking a sausage in a coat of dough, the whole when cooked producing a food product of the sandwich type which can be eaten. The machine may be arranged as a battery of units, each one serving to cook one or more of the encased sausages, whereby they can be turned out rapidly and served hot.

The machine embodies a mold or set of molds within which a sausage is placed, a feeding mechanism for them feeding dough into the mold around the sausage, and heating means for baking or cooking the molded product. The molds are so arranged that the dough feeding device can be slid into position for delivering the charges of dough to the molds after the sausages are placed therein, and the dough feeding device may then be slid aside for the purpose of removing the encased sausages and serving the same. This permits a very rapid production of the articles. The apparatus will be found very profitable and convenient for serving the products rapidly and attractively.

In the accompanying drawings, wherein one form of the invention is shown, Fig. 1 is a plan view of a machine showing a battery or gang of the baking molds. Fig. 2 is a plan of the baked product. Fig. 3 is a wiring diagram of one of the baking units. Fig. 4 is a vertical section on the line 4—4 of Fig. 1, showing a sausage in position in one of the molds, with the mold closed, and the mold port open to receive the charge of batter or dough. Fig. 5 is a section on the line 5—5 of Fig. 4. Fig. 6 is a bottom face view of the upper half of a mold. Fig. 7 is a plan of the lower half of a mold. Fig. 8 and 9 are sections through the mold halves. Figs. 10, 11, 12 and 13 are details of the actuating levers for the batter valves. Fig. 14 is a detail of a bracket for the levers.

The device may comprise a gang of molds as shown in the drawings, or one mold alone may be used. Each mold or unit is indicated as a whole at 1, and has a lower half casing 2 supported on legs 3. The casing has an upper half 7 which may be swung open as hereinafter described. The molds in which the sausages and dough are baked are indicated at 4, comprising a lower half 5 secured to the lower section 2 of the casing, and an upper half 6 secured to the top half 7 of the casing. The mold sections thus constructed are hinged together as indicated at 8 so that the upper half may be swung open. 9 is an extension on the back of the top half of the mold which acts as a stop when the mold is opened. The mold sections 5 and 6 are provided with tongues and grooves indicated at 10 and 11 so as to seal the mold when it is closed and prevent the batter leaking out, and each mold section has projections 12 on the inner surface thereof to space and position the sausages with respect to the wall of the mold, the sausages being indicated at 13. The upper section 7 has a handle 14 so that it may be opened, and the upper section 6 of the mold has a spout 15 through which it may be filled, opening through a port at 16 in the casing 7. The spout or opening may be closed by a hinged plug 17 carried by a frame 18 pivoted to brackets 19 and provided with a handle 20, the number of plugs carried by each frame corresponding to the number of molds in each unit.

To heat the molds I provide resistance coils 21 extending around the upper and lower mold halves 5 and 6, these coils being embedded in a heat conducting composition 22, which is enclosed by an asbestos or other non-conducting composition 23 located within the casing sections. 24 indicate the binding posts connected to the upper resistance coils and 25 the binding posts of the lower coils; 26 the connecting wires between the posts 24 and 25, and 27 the leads running to rheostats 28 and the supply line, the rheostats being conveniently enclosed in a control box 29.

At 30 are indicated L-shaped end members of a frame which has intermediate bracket arms 31, and 32 indicate tie rods which connect the legs 3, the end frames 30 and the arms 31, mounting a plurality of units 1 in a battery or gang as shown in Fig. 1. The back members of the frame support a lower guide rod 33 and an upper guide rod 34, the latter having shallow notches 35. 36 is a bracket frame which slides on the rods 33 and 34, and carries a dog 37 adapted to engage the notches 35 by the pressure of a light spring 38. 39 is a band riveted to the bracket 36 and provided at the front with a handle 40. This band receives and supports a batter tank or receptacle 41, provided with a projection or stop 42 to rest on the band 39 and support the tank. The tank has a plurality of measuring compartments 43 at the bottom thereof, each compartment terminating in a nozzle 45 controlled by a valve 44. A valve 46 controls an outlet from the batter tank to each measuring cylinder 43, and each valve 46 carries a tube 47 which extends upwardly to the top of the tank. Each valve 44 is connected to a rod 48 which works loosely through a guide hole at 49 in the valve 46 and extends upwardly through the tube 47. 50 is a bracket mounted on the front of the tank and supporting a rod 51 which forms the pivot of the valve actuating levers. One lever 52 is connected to the upper end of the rod 48 and is provided with a button which may be pressed by the operator, whereby each valve 44 may be operated singly. To operate three valves simultaneously, a light bar 53, pivoted by arms to the rod 51 and resting on the levers 52, may be pressed down, so operating all three valves at once. The tube 47 is pivotally connected at its upper end to a lever 54 pivoted on the rod 51 and terminating in a button which may be pressed by the operator to open a single valve 46. To open valves 46 simultaneously, a bar 55, similar to the bar 53, extends across the levers 54, and may be pressed down for the purpose stated.

The temperature of the various baking units may be controlled by the several rheostats 28. Obviously other means for controlling the temperature may be provided, but the system illustrated is quite simple and convenient.

In operation, the tank is filled with batter. The molds adjacent to the tank are opened and the sausages placed therein. Then the molds are closed, the ports 16 being open. By grasping the handle 40 the operator can then shift the tank to position above the selected molds, centering the nozzles 45 above the openings. This action is assisted by the notches 35 in the guide bar 34, the dog engaging therein and indicating that fact by a slight click. The guide rod has notches corresponding in position to the various units, so that the tank may be centered above the selected unit. By slight special effort the dog will spring out of engagement when the tank is to be slid to a different position. When the spouts are centered as stated the operator presses on the bar 55 thereby opening the valves 46 and allowing the batter to flow into the measuring compartments 43, the air escaping through the holes 49 and tubes 47. When the compartments 43 are filled the bar 55 is released and the valves 46 closed by gravity. Then, the outlet valves 44 are opened by pressing on the bar 53 and the batter will flow through the nozzles 45 and the necks 15 into the molds, filling the space around the sausages. The bar 53 is then released, the valves 44 closing by gravity, and the tank may be slid along to the next position. Then the frame 18 is swung over and the plugs 17 close the openings 15. Then the heating current is turned on, and when the sausages are baked sufficiently the upper half of the mold may be swung open by the handle 14 and the baked articles removed. The batter tank may be slid on its guide rods without interference, either when the mold is opened or closed, so that any unit in the gang may be supplied with batter. When the molds are opened the upper half swings back out of the path of movement of the batter tank; and similarly with respect to the frames 18; as clearly appears in Fig. 4.

The apparatus so constructed will serve for the purpose of quickly and conveniently cooking a multiplicity of sausages encased in dough. The electric heating means dispense with the use of fire, and the apparatus may be set up and operated wherever current is available. It is capable of considerable simplification for small installations. Thus a single mold may be used and the batter poured into the same by hand from a portable tank or the like.

The invention is not limited to the particular apparatus shown, but many modifications are possible within the scope of the following claims.

I claim:

1. A cooking device comprising an openable mold in which a sausage or the like may be placed, means to introduce batter into the mold around the sausage, and an electric heating coil encased in the mold, to heat the interior thereof.

2. A cooking device comprising a mold provided on the inside with projections adapted to support a sausage or the like and space the same from the inner wall of the mold, and an inlet through the top of the mold, whereby said space may be filled with batter.

3. A cooking device comprising a mold provided on the inside with projections adapted to support a sausage or the like and space the same from the inner wall of the mold, and an inlet through the top of the mold, whereby said space may be filled with batter, and electric heating means encased in the mold, around the mold cavity.

4. A cooking device comprising a mold having upper and lower sections hinged together and an inlet for batter or the like extending through the top section, and a heating coil encased in the mold and surrounding the cavity therein.

5. In a cooking apparatus, the combination with a mold having an openable top with an inlet opening in the top, and a movable batter tank supported above the mold and having a measuring compartment provided with an outlet adapted to be registered with said inlet, to feed a charge of batter into the mold.

6. In a cooking apparatus, the combination with a gang of molds having hinged tops with openings in the tops, of a batter tank slidable above the molds out of the path of movement of the tops and provided with valve controlled means to feed a quantity of batter into each mold.

7. A cooking apparatus, comprising a gang of molds arranged in a line, and having hinged tops with inlet openings therein and a tank slidably mounted above the molds and movable to register with any one of said openings, and provided with a measuring device constructed to feed a predetermined amount of batter to each mold.

8. In a cooking apparatus, the combination of a mold having a lower fixed section and an upper section hinged thereto, said upper section having an opening in the top, and a batter tank movably mounted above the mold and having a nozzle which may be registered with said opening to feed batter into the mold.

9. In a cooking apparatus, the combination of a mold having a lower fixed section and an upper section hinged thereto, said upper section having an opening in the top, a batter tank movably mounted above the mold and having a nozzle which may be registered with said opening to feed batter into the mold, and means to close said opening after the mold is filled.

In testimony whereof, I affix my signature in presence of two witnesses.

WILLIAM S. Du CHARME.

Witnesses:
JOHN A. BOMMHARDT,
BESSIE F. POLLAK.